United States Patent
De Valroger (10) Patent No.: US 10,396,983 B2
(45) Date of Patent: Aug. 27, 2019

(54) METHOD FOR CRYPTOGRAPHIC COMMUNICATION BASED ON PURE CHANCE

(71) Applicant: Thibault De Valroger, Paris (FR)

(72) Inventor: Thibault De Valroger, Paris (FR)

(*) Notice: Subject to any disclaimer, the term of this patent is extended or adjusted under 35 U.S.C. 154(b) by 0 days.

(21) Appl. No.: 15/562,799

(22) PCT Filed: Apr. 6, 2016

(86) PCT No.: PCT/FR2016/000070
§ 371 (c)(1),
(2) Date: Sep. 28, 2017

(87) PCT Pub. No.: WO2016/166426
PCT Pub. Date: Oct. 20, 2016

(65) Prior Publication Data
US 2018/0287781 A1  Oct. 4, 2018

(30) Foreign Application Priority Data
Apr. 14, 2015 (FR) ..................... 15 00759

(51) Int. Cl.
*H04L 29/06* (2006.01)
*H04L 9/08* (2006.01)
(Continued)

(52) U.S. Cl.
CPC .............. *H04L 9/085* (2013.01); *G06N 5/04* (2013.01); *G06N 7/005* (2013.01); *H04L 9/0838* (2013.01);
(Continued)

(58) Field of Classification Search
CPC ................................................... H04L 9/085
See application file for complete search history.

(56) References Cited

U.S. PATENT DOCUMENTS

| | | | | |
|---|---|---|---|---|
| 2005/0038638 A1* | 2/2005 | Comaniciu | .......... | G05B 13/048 703/2 |
| 2014/0187427 A1* | 7/2014 | Macready | ............ | G06N 99/002 505/170 |
| 2014/0279737 A1* | 9/2014 | Horvitz | ................... | G06F 17/18 706/12 |

FOREIGN PATENT DOCUMENTS

FR   3002349 A1   8/2014

OTHER PUBLICATIONS

Payandeh, A., M. Ahmadian, and M. Reza Aref. "Adaptive secure channel coding based on punctured turbo codes." IEEE Proceedings-Communications 153.2 (2006): 313-316. (Year: 2006).*

(Continued)

*Primary Examiner* — Shawnchoy Rahman
(74) *Attorney, Agent, or Firm* — Tarolli, Sundheim, Covell & Tummino LLP (57) ABSTRACT

A cryptographic communications system enables two entities related by an insecure communication channel and having initially no privately shared knowledge, to agree on a shared unconditionally secure information. Each one of the entities has the capability to generate a new form of randomness called Deep Random, such that any other entity than itself cannot know anything about the probability distribution except a given public characteristic. The internal system of each entity is made up with: (1) a Deep Random Generator (DRG) capable of generating Deep Random signals and of making calculations using the generated signals, and (2) an Interactive Communication Module (ICM) capable of publishing to and reading from the insecure channel. The two entities execute a communication protocol such that they can each compute their respective estimations of the shared information that are probabilistically as close as desired from perfect equality.

10 Claims, 4 Drawing Sheets

Specific embodiment of a Deep Random based Perfect Secrecy Protocol (51) Int. Cl.
  H04L 9/12      (2006.01)
  G06N 5/04      (2006.01)
  G06N 7/00      (2006.01)
(52) U.S. Cl.
  CPC .......... *H04L 9/0844* (2013.01); *H04L 9/0858* (2013.01); *H04L 9/0861* (2013.01); *H04L 9/0869* (2013.01); *H04L 9/0875* (2013.01); *H04L 9/12* (2013.01); *H04L 2209/80* (2013.01)

(56) References Cited

OTHER PUBLICATIONS

Castro, Miguel, et al. "Secure routing for structured peer-to-peer overlay networks." ACM SIGOPS Operating Systems Review 36.SI (2002): 299-314. (Year: 2002).*
Bernstein, Greg Maurice, and Michael A. Lieberman. "Secure random number generation using chaotic circuits." IEEE Transactions on Circuits and Systems 37.9 (1990): 1157-1164. (Year: 1990).*
Shafi, Goldwasser, and Silvio Micali. "Probabilistic encryption." Journal of computer and system sciences 28.2 (1984): 270-299. (Year: 1984).*
Thibault De Val roger: "Perfect Secrecy under Deep Random assumption", Jul. 29, 2015 (Jul. 29, 2015), XP055255573, Retrieved from the Internet: URL:http://arxiv.org/ftp/arxiv/papers/1507/1507.08258.pdf [retrieved on Mar. 4, 2016] paragraphs [OOOI]. [OIII].
Khiabani Yahya Sowti et al: "Exponent i al secrecy against unbounded adversary using joint encryption and privacy amplification", 2013 IEEE Conference on Communications and Network Security (CNS),IEEE, Oct. 14, 2013 (Oct. 14, 2013), pp. 198-206, XP032529027,DOI: 10.1109/CNS.2013.6682708 paragraphs [OOOI], [OOIV], [OOOV].
Yahya Sowti et al:"Achievable Secrecy Enhancement Through Joint Encryption and Privacy Amplification", Jan. 1, 2007 (Jan. 1, 2007), XP055255973, Retrieved from the Internet: URL:http://etd.lsu.edu/docs/available/etd-06042013-134734/unrestricted/Diss_Sowti_Yahya.pdf paragraphs [01. 2], [01. 6], [01. 7], [02.4]. [03.2]. [03.3] paragraph [0004].
Yahya Sowti Khiabani et al:"ARQ-Based Symmetric-Key Generation Over Correlated Erasure Channels", IEEE Transactions on Information Forensics and Security, IEEE, Piscataway, NJ, US, vol. 8, No. 7, Jul. 1, 2013 (Jul. 1, 2013), pp. 1152-1161, XP011514862, ISSN: 1556-6013, DOI: 10.1109/TIFS.2013.2264461 paragraph [OOOI]—paragraph [OOIV].
Masahito Hayashi: "Exponential decreasing rate of leaked information in universal random privacy amplification", arxiv.org, Cornell University Library, 201 Olin Library Cornell University Ithaca, NY 14853, Apr. 2, 2009 (Apr. 2, 2009), XP080318076, paragraph [OOII].
Ishai Yet al: "Extracting Correlations", Foundations of Computer Science, 2009. FOCS '09. 50th Annual IEEE Symposium on, IEEE, Piscataway, NJ, USA, Oct. 25, 2009 (Oct. 25, 2009), pp. 261-270, XP031653199, ISBN: 978-14244-5116-6 paragraph [OOOI] paragraph [0004].
U. Maurer et al: "Secret-key agreement over unauthenticated public channels-part III: privacy amplification", IEEE Transactions on Information Theory, vol. 49, No. 4, Apr. 1, 2003 (Apr. 1, 2003), pp. 839-851, XP055256222, USA ISSN: 0018-9448, DOI:10.1109/TIT.2003.809559 paragraph [OOII].
Paul MB Vitanyi: "Randomness", arxiv.org, Cornell University Library, 201 Olin Library Cornell University Ithaca, NY 14853, Oct. 8, 2001 (Oct. 8, 2001), XP080063589, paragraph [0003].
Marcus Hutter: "Universal Algorithmic Intelligence: A mathematical top->down approach", arxiv.org, Cornell University Library, 201 Olin Library Cornell University Ithaca, NY 14853, Jan. 20, 2007 (Jan. 20, 2007), XP080269648, paragraph [0003].
Gerard Rauch: "Les groupes finis et leurs representation, Chapitre 3: Les theoremes de Sylow; le groupe symetrique" In: "Les groupes finis et leurs representation, Chapitre 3: Les theoremes de Sylow; le groupe symetrique", Jan. 1, 2000 (Jan. 1, 2000), XP055140577, ISBN: 978-2-72-980180-9 pp. 25-38, paragraph [03.3].
Jean-Etienne Rombaldi: "Propriete 2.2.3 L'ordre d'un kl . . . kr-cycle est egal au ppcm des ordres des cycles composant ce kl . . . kr-cycle.", Jan. 9, 2012 (Jan. 9, 2012), XP055154081, Retrieved from the Internet: URL:http://www-fourier.ujf-grenoble.fr/ro mbaldi/Agreginterne/Orall/102.pdf [retrieved on Nov. 19, 2014] paragraphs [03.1]—[03.5], [03.9].
International Search Report of PCT/FR2016/000070 dated Apr. 7, 2016.

\* cited by examiner

Fig. 1 – General model for Deep Random based Perfect Secrecy Protocols

100 – Continuous generation of Deep Random distributions
101 – Request / response to DRG from ICM to perform operations involving data generated from a DRG process
102 – Publications from the AE to the public communication channel
103 – Readings by the AE from the public communication channel
104 – calculations performed by the AE from information coming from its DRG and from the public communication channel Fig. 2 – Specific embodiment of a Deep Random based Perfect Secrecy Protocol 200 – Continuous generation of Deep Random distributions
210 – request for generation of {x} and output of {i}
211 – selection of phy and psi, generation of {x} and {i}
212 – response of DRG
213 – request for generation of yO
214 – selection of phy', generation of yO
215 – response of DRG
220 – publication of {i} by A
221 – reading of {i} by B
230 – request for jO
231 – calculation of synchro permutation and generation of jO
232 – response of DRG with jO 240 – publication of jO by B
241 – reading of jO by A
250 – request for VB
251 – calculation of VB
252 – response from DRG with VB
253 – request for VA
254 – calculation of VA
255 – response from DRG with VA
260 – Privacy amplification Fig. 3 – Collaboration model between Deep Random Generators Fig. 4 – Internal view of a Deep Random Generator working with a recursive generation method 400 – Continuous generation of Deep Random distributions
410 – External request / response for a Deep Random output signal. In a tamper resistant Level 2 implementation, the output is never going out of the DRG, it is rather stored for future use in the Internal Memory (as per 440)
411 – External request / response for a standard random output signal
412 – External request / response for a treatments on DR output signal (calculation / supression)
420 – Internal request / response for a Deep Random output signal
430 – Internal request / response for a standard random output signal. Such request can also input a previously stored DR output signal in order to generate an engendered variable from this DR output signal
440 – Storage of a DR output signal in the Internal Memory
441 – Reading of a DR output signal previously stored in the Internal Memory
442 – Request for supression of DR output signal previously stored in the Internal Memory

METHOD FOR CRYPTOGRAPHIC COMMUNICATION BASED ON PURE CHANCE

RELATED APPLICATIONS

The present invention is a U.S. National Stage under 35 USC 371 patent application, claiming priority to Serial No. PCT/FR2016/000070, filed on 6 Apr. 2016; which claims priority of FR 15/00759, filed on 14 Apr. 2015, the entirety of both of which are incorporated herein by reference.

1. FIELD OF INVENTION

The invention relates to cryptographic systems.

2. DESCRIPTION OF PRIOR ART

Modern cryptography mostly relies on mathematical problems commonly trusted as very difficult to solve, such as large integer factorization or discrete logarithm, belonging to complexity theory. As no certainty exist on the actual difficulty of those problems, not even the truth of the famous P≠NP conjecture, some other methods, rather based on information theory, have been developed since early 90's. Those methods relies on hypothesis about the opponent (such as «memory bounded» adversary [6]) or about the communication channel (such as «independant noisy channels» [5]); unfortunately, if their perfect secrecy have been proven under given hypothesis, none of those hypothesis are easy to ensure in practical. At last, some other methods based on physical theories like quantum undetermination [3] or chaos generation have been described and experimented, but they are complex to implement, and, again, relies on not proven theories.

Considering this unsatisfying situation, we propose a new method, where proven perfect secrecy can be reached, without relying on any assumption about the opponent, that is supposed to have unlimited calculation and storage capacities, nor about the communication channel, that is supposed to be perfectly public, accessible and equivalent for any playing party (legitimate partner and opponent). The considered opponent is passive, which means that it does not interfere actively in the communication by suppressing, adding or modifying information exchanged between the legitimate partners; it just has a full access to it. Active opponent can also be considered by adding authentication schemes between the legitimate partners in the communication protocol.

REFERENCES

[1] C. E. Shannon, «Communication theory of secrecy systems», Bell Syst. Tech. J., Vol. 28, pp. 656-715, October 1949
[2] A. N. Kolmogorov, «On Tables of Random Numbers», Sankhya. Indian Journal of Statistics A, 25(4):369-376
[3] C. H. Bennet and G. Brassard, «Quantum cryptography and its application to provable secure key expansion, public-key distribution and coin-tossing», Proc. IEEE International Conference on Computers, Systems and Signal Processing, Bangalore, India, pp. 175-179, December 1984
[4] C. H. Bennet, G. Brassard and J.-M. Robert, «Privacy Amplification by Public Discussion», SIAM J. COMPUT., Vol. 17, No. 2, April 1988
[5] U. M. Maurer, «Secret Key Agreement by Public Discussion from Common Information», IEEE Transactions on Information Theory, Vol. 39, No. 3, May 1993
[6] C. Cachin and U. M. Maurer, «Unconditional Security Against Memory-Bounded Adversaries», Proceeding of CRYPTO '97, Lecture Notes in Computer Science, Springer, 1997

The inventor has published the following scientific articles related to the invention herein described posteriorly to the priority date of the application:

[7] T. de Valroger, «Perfect Secrecy under Deep Random assumption», Arxiv.org (http://arxiv.org/abs/1507.08258)
[8] T. de Valroger, "Simulation for Deep Random Secrecy Protocols", Arxiv.org (https://arxiv.org/abs/1611.01683)

3. SUMMARY AND OBJECT OF THE INVENTION

We consider two Autonomous Entities (AE), called legitimate corresponding AE, willing to communicate over an insecure public channel. Like in every classical protocol modelization, those AE are entities capable to generate random bit strings, publish bit strings, read bit strings published by other AE on the public channel, store bit strings, make calculation on bit strings. The main difference of our method is that random generation includes Deep Random generation. Deep Random is a source of digital randomness such that an external obsever cannot know anything about the probability distribution of the digital random variable, except some public characteristics. Thus, such Deep Random variables are not subject to Bayesian inference evaluation.

An AE is constituted (FIG. 1) with two components:

The Deep Random Generator (DRG). A DRG is capable of:

Producing continuously new/evolutive probability distributions, called Deep Random distributions, whose characteristic is given below Generating and storing, upon request of authorized associated ICM, some random digital information using its Deep Random probability distributions, those information having to remain secret for the purpose of the secrecy of the communication Performing, upon request of authorized associated ICM, calculations involving the said secret digital information The Interactive Communication Module (ICM). An ICM is capable of:

Publishing information on the public channel (to the attention of its legitimate corresponding AE)

Reading information from the public channel

Executing a communication protocol called Perfect Secrecy Protocol, whose characteristic is given below.

The two main characteristics of the present invention are (i) the generation of Deep Random probability distributions, and (ii) the execution of Perfect Secrecy Protocol. They are designed to work together, which gives the unity of the invention. They produce perfect secrecy without the need of prearrangement of secret key and without any condition or limitation regarding the communication channel and the opponent, which gives the innovativeness and usefulness of the invention. They can be embodied in several forms, but at least one is described in the section 5 below, which shows that such invention is subject to industrial application. In addition, the author did obtain the mathematical proof of the perfect secrecy, which was not the case with former patented methods; nevertheless, the details of this mathematical proof are complex and thus are not explicited in the present description.

(i) Characteristics of Deep Random Generators:

Deep Random generated by an AE called A is a source of randomness such that its probability distribution is made practically unknowledgeable (or hidden) for a given set of AE called opponents, and each one denoted ξ. In practice, this set of AE is generally all AE other than A. More generally, the probability distribution may be hidden for ξ except a public characteristical information I (we denote $\Omega_I$ the set of probability distributions verifying the characteristical information I). Such a randomness source has the following characteristic:

If X and Y are two random variables, and if X has a hidden probability distribution for ξ except a given characteristical information I, then:

$E[\varphi(X)|Y]_\xi$ has no dependency with probability distribution of X within $\Omega_I$ (H)

where $E[\varphi(X)|Y]_\xi$ designates the conditional expectation of $\varphi(X)$ from restricted knowledge of Y by ξ.

We can give a weaker, but more concrete formulation of this characteristic, associated to engendered variables. As a general definition, if V is a random variable with values in a set E, a random variable V' with values in a set F is engendered variable from V if there exists an engendering distribution $\psi: E \times F \mapsto [0,1]$ such that $\forall x \in E, \Sigma_{y \in F} \psi(y, x) \partial y = 1$ and being the probability distribution of V':

$$P(V'=y|V=x)=\psi(y,x)$$

The weaker formulation is then the following: let Y be a random variable with values in F, engendered by any variable with values in E through the same engendering distribution $\psi: E \times F \mapsto [0,1]$. If X and X' are two random variables with values in E and probability distributions in $\Omega_I$ both hidden for ξ except the characteristical information I, then:

$E[\varphi(X)|Y]_\xi = E[\varphi(X')|Y]_\xi$ (H')

Viewed from AE to which the probability distribution is hidden, the capabilities of calculation related to that random variable are of course more limited than for a traditional one in probability theory. The concept of «weighting» of possible values in sample space, is replaced by the concept of simple existence of such values.

It is important to understand that stating that a random variable's probability distribution is unknowledgeable doesn't mean that its probability distribution doesn't exist. It only means that it is hidden to a given set of AE. For any other AE (knowing probability distribution of X), the random variable remains governed by traditional probability theory.

It may appear as a non sense to desire to generate Deep Random from a deterministic computable program. In the real world, even a computer may access sources of randomness whose probability distribution is at least partly unknown, but it doesn't mean that we can build from it Deep Random reliable for cryptographic applications.

3 methods exist to generate programmatically Deep Random within an AE:

1) Secure programming: in this method, the program generating Deep Random (DRG) is securely elaborated within a closed industrial process and is kept secret to external AE. For industrial application, it is embedded into tamper resistant device and can only be requested to generate a given output random signal 2) Recursive generation: in this method the DRG program executes a continuous recursive generation sequence, where at each step m+1, the probability distribution is created/selected to defeat the prediction of the optimal predicting strategy for the probability distributions of steps ≤m. This method can be implemented in a program that is continuously running in a computing environment, and that can be requested at any time to output a random signal taken from a draw based on the current value of the probability distribution sequence. Such implementation can be done in software or embedded in tamper resistant hardware to improve confidentiality of the current stance of the counter and of the probability distribution sequence. For such a method to be secure, the entropy of the output random signal should not be greater than the entropy of the current counter value. An example of such method is given in section 5.

Figure 3:
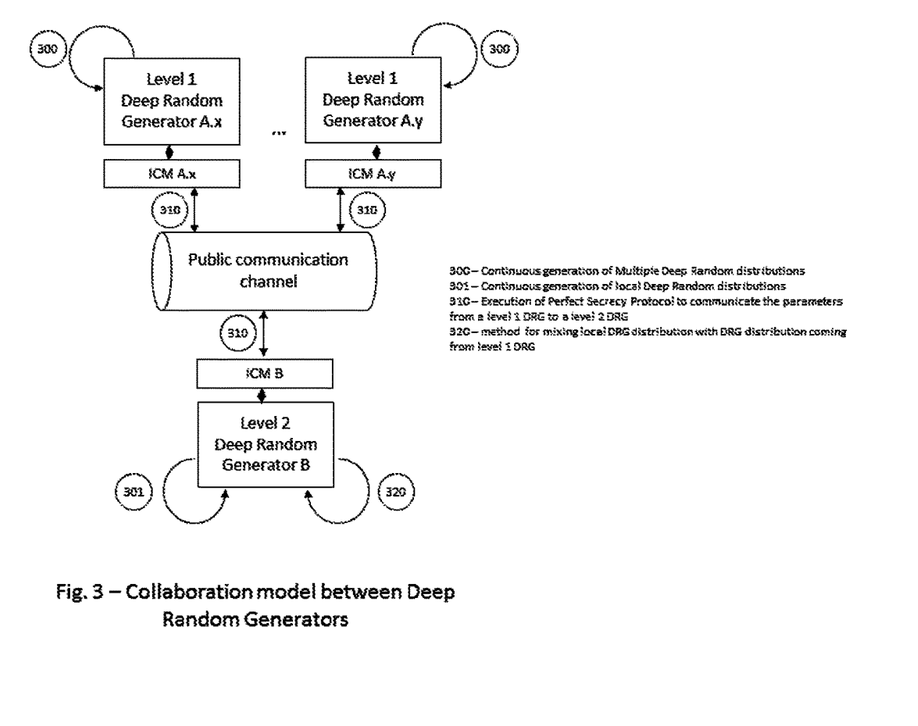
FIG. 3 shows a collaboration model between Deep Random Generators, where one or several level 1 AE (denoted A·x, A·y) can securely transfer the parameters of a Deep Random probability distribution to a level 2 AE (denoted B). B can then combine those sources potentially together with its own ones, to generate new local Deep Random source.

3) Combination: in this method, different sources of Deep Randomness are combined. Those sources can come from external collaborative AE as per FIG. 3. In this case, Perfect Secrecy protocol is used to exchange probability distribution parameters from one or several level 1 collaborative AE to the considered level 2 AE. The combination methods are such that if at least one of the combined source is actually Deep Random, the result of the combination with other sources is also Deep Random, meaning that its probability distribution remains hidden to the opponents.

Regarding the recursive generation, if one doesn't know the date of beginning and the speed of an infinite counter, no probability distribution can be even approximated about the value of the counter at a given time, because of the unlimited nature of a counter. If performed in a physical computing source, the actual speed of the counter is impacted by all external tasks of the processor, for which no probability distribution can be estimated, the only thing that an opponent can do is estimate a rough upper bound of that speed.

(ii) Characteristics of Perfect Secrecy Protocol:

Let's first define our general communication protocol model.

Figure 1:
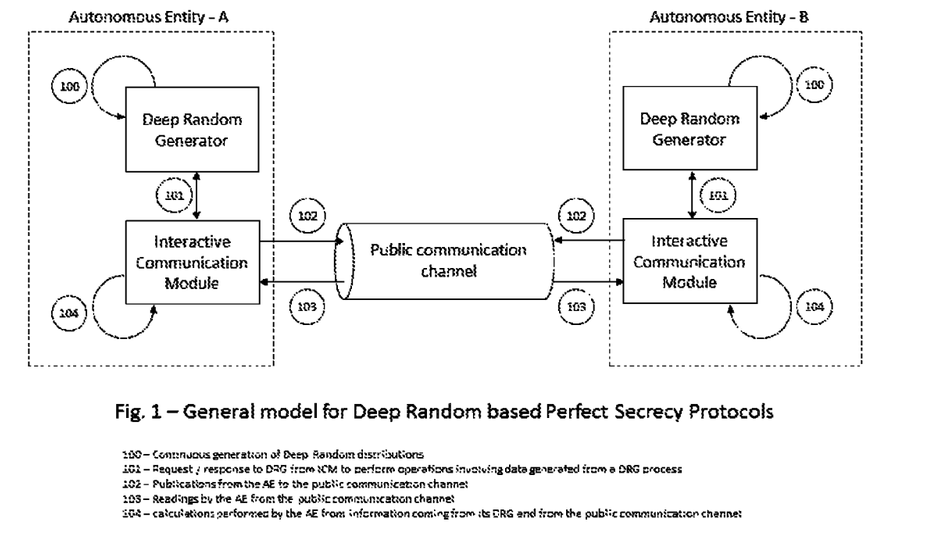
FIG. 1 shows the general model for Deep Random based Perfect Secrecy Protocols, where each AE involved in the protocol (denoted A and B) is running a DRG and an ICM. ICM of A and ICM of B are connected through an errorless public channel, over which any AE is supposed to have full reading access.

A protocol is a communication procedure involving 2 legitimate communicating AE (A and B) that can be decomposed in a finite number of steps $t_1, \ldots, t_R$ such that at each step r<R:

a) A and B generate respectively a new information $x_r$ and $y_r$ (using potentially classical random or Deep Random thanks to their DRG as per FIG. 1—interaction 100 & 101), potentially involving the knowledge of respectively $\{x_m\}_{1 \leq m < r}, \{i_m, j_m\}_{1 \leq m < r}$, and $\{y_m\}_{1 \leq m < r}, \{i_m, j_m\}_{1 \leq m < r}$. To that extent, the DRG may be requested by the ICM as per FIG. 1—interaction 101 and the ICM reads the information published by the other party at previous step as per FIG. 1—interaction 103.

b) A and B publish respectively an information $i_r$ and $j_r$ that may depend respectively on $\{x_m\}_{1 \leq m < r}, \{i_m, j_m\}_{1 \leq m < r}$, and $\{y_m\}_{1 \leq m < r}, \{i_m, j_m\}_{1 \leq m < r}$. To that extent the ICM writes the information on the public channel as per FIG. 1 interaction 102.

At last step R, A and B only perform calculations involving the knowledge of respectively $\{x_m\}_{1 \leq m < R}, \{i_m, j_m\}_{1 \leq m < R}$, and $\{y_m\}_{1 \leq m < R}, \{i_m, j_m\}_{1 \leq m < R}$. One of the result of those calculations (as per FIG. 1 interaction 104) is an estimation of the shared information. Those estimations are respectively denoted $V_A$ and $V_B$.

$\{\mathcal{P}_v\}_v$ is called a configurable protocol, with v a vector of numerical parameters fixed before running the protocol, if the description of the implementation of the protocol (including the capacity of generating Deep Random) have a size bounded by H(v)+K, where H is the entropy and K a constant not depending on v.

Perfect Secrecy Protocols are special protocols within the above general model, for which, assuming the above (H) and (H') for signal generated by DRG, the most efficient strategy for an opponent (conditional expectation) to estimate say $V_A$ is less efficient than $V_B$ (Advantage Distillation [4]). Such protocols also include a so called Reconciliation and Privacy Amplification methods [4] to transform the said Advantage into a secure shared information exclusively between legitimate partners. This information, that can be of size as long as desired (repetition of the protocol), can be used to exchange securely a meaningful message between the legitimate partners or directly (one time pad XOR) or by exchanging a symmetric cryptographic key applicable with any block or stream cipher.

More formally, if we consider a protocol P, the whole set of random information generated by respectively A and B obey to a probability distribution respectively in sets that we call $\mathfrak{L}_A(P)$ and $\mathfrak{L}_B(P)$. The use of Deep Random enables to consider, depending on P, several subsets of $\mathfrak{L}_A(P) \times \mathfrak{L}_B(P)$: $(H_1^A, H_1^B), \ldots$ such that they contain only distributions that cannot be distinguished between each others by the opponent. Those subsets are supposed to be maximized (because they can be complemented if not). We can consider the group of reversible transforms $\{h_m(s)\}_m$ (supposed to be enumerable) of $\mathfrak{L}_A(P) \times \mathfrak{L}_B(P) \mapsto \mathfrak{L}_A(P) \times \mathfrak{L}_B(P)$, that let $(H_s^A, H_s^B)$ stable. Each of those transforms induces a reversible transform $\overline{\omega}_m(s)$ in the set of strategies for the opponent $\{\omega_{\{i_r\},\{j_r\}}\} = \Omega_P$. We thus denote $\Omega_P(s)$ the subset of $\Omega_P$ containing the strategies invariant by action of the induced group $\{\overline{\omega}_m(s)\}_m$. The hypothesis of the Deep Random (H) and (H') thus enables to restrict the strategy of the opponent to any of those subsets $\Omega_P(s)$.

We denote $H_P(\epsilon, \epsilon')$ the minimum quantity (number of digits) that is to be exchanged through P to obtain:

$$d_h(V_A, V_B) \leq \epsilon H(V_B) \quad \text{(i)}$$

$$\inf_s (\sup{}^{p_\omega \in \Omega_P(s)} |d_h(\omega, v_B) - \tfrac{1}{2} H(V_B)|) \leq \epsilon' H(V_B) \quad \text{(ii)}$$

Where $d_h$ denotes the Hamming's distance, and H(•) denotes Shannon's entropy [1]. If the 2 conditions above cannot be fulfilled, then $H_P(\epsilon, \epsilon') = \infty$. A configurable protocol $\{P_v\}_v$ is called a Perfect Secrecy Protocol if, $\forall \epsilon, \epsilon' > 0$, there exists $v(\epsilon, \epsilon')$ under hypothesis of the Deep Random (H) and (H'), such that $$H_{P_v}(\epsilon, \epsilon') < \infty$$

The three minimal characteristics of Perfect Secrecy Protocols are:
1) Deep Random (DR): Both legitimate partner involved in the protocol make use of a DRG
2) Degradation: For both legitimate partner involved in the protocol, the information published by it is at least partly degraded from the associated output signal generated by its DRG. This means that the published information is the result of an engendered variable from the output signal generated by the DRG such that the accuracy of the output of the said engendered variable is made lesser (through the degradation process) than the accuracy of the output signal generated by the DRG.
3) Advantage Distillation under DR assumption ((H) and (H')): Under (H) and (H'), a strategy for the opponent cannot be considered as more efficient than at least one other strategy belonging to a given set $\Omega$, called restriction set of strategies for the protocol; and for any strategy in $\Omega$ adopted by the opponent, the estimation of the shared information given by the said strategy is strictly less accurate than the estimations of the legitimate partners.

To illustrate degradation, let's give a simple example: let's consider an AE beholding an experiment of binary random variable V with parameter $\theta \in [0,1]$. If the AE wants to generate a new binary random variable based on the result of the experiment, it can only affect parameters $\{\theta_0, \theta_1\}$ depending on the $\{0,1\}$ result of the experiment of V. The parameter of the new binary random variable V' is then:

$$\theta_0 + (\theta_1 - \theta_0)\theta$$

Let's now replace $\theta$ by $\theta/k$ where k is a real number $>1$; it is thus impossible to engender from V a binary random variable with parameter $\theta$ (because $|\theta_1 - \theta_0| \leq 1$). The beholding AE can of course multiplicate the obtained experiment by k (resulting into an engendered variable with value in $\{0,k\}$ instead of $\{0,1\}$), in order to obtain an engendered variable with same first moment than V, but the variance (second moment, representing accuracy) of that engendered variable is then strictly larger than the variance of V. The AE then have to «make a choice» between first and second moment, but cannot get both in the same engendered variable.

An example of such Perfect Secrecy Protocol is given in section 5, as specific embodiment of the invention.

5. DESCRIPTION OF A SPECIFIC EMBODIMENT i) Description of a Specific Embodiment of Deep Random Generator The specific embodiment presented in this section corresponds to a recursive method as per section 3. (i) 2), associated with a combination method as per section 3. (i) 3). It can be implemented in a software program or tamper resistant hardware device.

Figure 4:
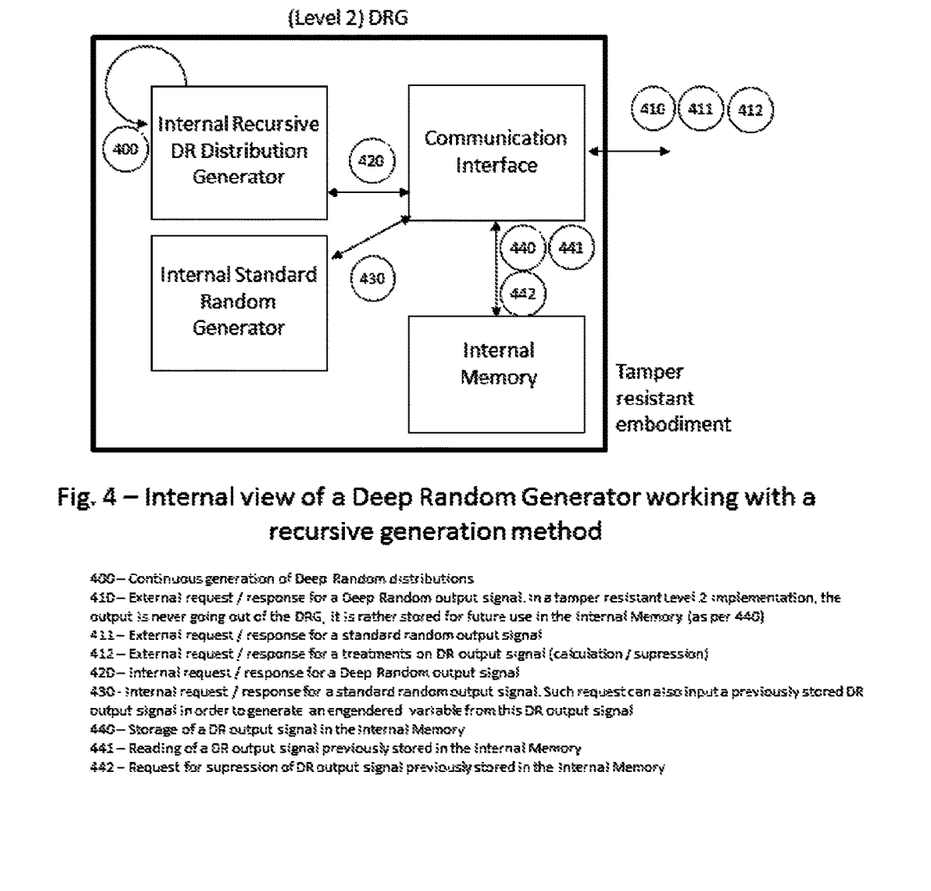
FIG. 4. shows a Deep Random Generator working with continuous recursive generation method in block diagram form. It is embodied in a tamper resistant shell, and is logically made up with 4 sub-modules: the Internal Recursive DR Generator, the Internal Standard Random Generator, the Internal Memory, and the Communication Interface, which is the only of the four sub-modules to be enabled to communicate with the external environment.

FIG. 4. shows an embodiment of Deep Random Generator working with continuous recursive generation method in block diagram form. Such DRG has typically 4 sub-components:

An Internal Recursive DR Distribution Generator, that produces [FIG. 4-400] a continuous recursive sequence of probability distribution and is capable of outputting upon request [FIG. 4-420] an experiment obtained from the current value of the probability distribution sequence An Internal Standard Random Generator, that produces and outputs upon request [FIG. 4-430] an experiment from a known probability distribution, this probability distribution can need an input parameter such as an output signal of the internal DRG (in which case it generates an engendered variable from the DR probability distribution)

A Communication Interface, that enables to receive order from an associated ICM [FIG. 4-410, 411, 412]

An Internal Memory, that enables the Communication Interface to store, retrieve or suppress [FIG. 4-440, 441, 442] an output signal of the internal DRG.

In the following of this section 5.i), it will be focused on an example of the Internal Recursive DR Distribution Generator.

Let's define some notations; considering $x=(x_1, \ldots, x_n)$ and $y=(y_1, \ldots, y_n)$ some parameter vectors in $[0,1]^n$ and $i=(i_1, \ldots, i_n)$ and $j=(j_1, \ldots, j_n)$ some experiment vectors in $\{0,1\}^n$, $1$, $r \in \mathbb{N}_n^*$ two integers, and $\theta \in [0,1]$, we define:

x·y (resp. i·j) the scalar product of x and y (resp. i and j)

$$|x| \triangleq \sum_{s=1}^n x_s; |i| \triangleq \sum_{s=1}^n i_s$$

We will also manipulate permutation operators over vectors. For $\sigma \in \mathfrak{S}_n$, we write $\mathrm{supp}(\sigma)=\ker(\sigma-i^{d_{\mathfrak{S}_n}})=\{i, \sigma(i) \neq i\}$ and $|\sigma|=\mathrm{card}(\mathrm{supp}(\sigma))$. The permutation of a vector is the following linear application:

$\forall \sigma \in \mathfrak{S}_n$, $\sigma(x) \triangleq (x_{\sigma(1)}, \ldots, x_{\sigma(n)})$ where $\mathfrak{S}_n$ represents the symmetric group $\Phi$, $\Phi_m$ denote probability distributions outputting values in $[0,1]^n$. For such distribution $\Phi$, $\Phi \circ \sigma$ denotes another probability distribution outputting values in $[0,1]^n$ and such that:

$$\mathrm{Prob}_{\Phi \circ \sigma}(x) = \mathrm{Prob}_\Phi(\sigma^{-1}(x))$$

The quadratic matrix of such distribution $\Phi$ is:

$$M_\Phi(u,v) = \int_{[0,1]^n} x_u x_v \Phi(x) dx$$

Let $S_n$ stand for the set of the subsets I of $\{1, \ldots, n\}$ with size n/2; we define $\|\cdot\|_c$ the c-norm by:

$$\forall I \in S_n, c_I(M_\Phi) = \frac{4}{n^2} \sum_{u,v \in I \times I} M_\Phi(u, v);$$

$$\|M_\Phi\| = \max_{I \in S_n} |c_I(M_\Phi)|$$

We associate to any distribution quadratic matrix $M_\Phi$ the matrix $\overline{M_\Phi}$ defined by:

$$M_\Phi \mapsto \overline{M_\Phi} = m_\Phi \begin{pmatrix} 0 & \cdots & 1 \\ \vdots & \ddots & \vdots \\ 1 & \cdots & 0 \end{pmatrix}$$

where $m_\Phi = \frac{1}{n(n-1)} \sum_{u \neq v} M(u,v)$

We will denote in the followings:

$$\langle \omega, \Phi, \Phi' \rangle \triangleq E\left[\left(\omega_{i,j} - \frac{x \cdot y}{nk}\right)^2\right]_{\Phi, \Phi'}$$

$$\langle \omega, \Phi \rangle \triangleq \langle \omega, \Phi, \Phi \rangle$$

$$\Delta_0(\Phi, \Phi') \triangleq \int_{x,y \in [0,1]^n} \left(\frac{|x||y|}{n^2} - \frac{x \cdot y}{n}\right)^2 \Phi(x) \Phi'(y) dx dy$$

where $\omega$ denotes any strategy chosen by the opponent, depending on the public information i,j (this set of possible strategies is denoted $\Omega$), to bestly estimate $$\frac{x \cdot y}{nk}.$$

i,j are experiment vectors in $\{0,1\}^n$ generated from a Bernouilli distribution from the respective parameter vectors $$\frac{x}{k}, \frac{y}{k}.$$

The transform $$(x, y) \mapsto \left(\frac{x}{k}, \frac{y}{k}\right)$$

is the Degradation (as per section 3.(ii)) used in the present method, for both the DRG and the Perfect Secrecy Protocol described hereafter.

Finally, we denote:

$$\zeta(\alpha) \triangleq \{\Phi \,|\, \|M_\Phi - \overline{M_\Phi}\| \geq \sqrt{\alpha}\}$$

where $\alpha \in [0,1]$ is a scalar lower bound chosen as a configuration parameter, its value is a trade-off between the size of the entropy of the set of possible distributions, and the efficiency of the Synchronization step of the hereafter presented Perfect Secrecy Protocol; $\zeta(\alpha)$ corresponds to the set of distributions that are «far» from being symmetric. Only such distributions can be considered in the hereafter presented Perfect Secrecy Protocol to ensure the efficiency of its Synchronization step (Step 4).

Having set those notations, we can describe the constructing process of the sequences of probability distributions $\{\Phi[p]\}_{p \in \mathbb{N}_n, m \in \mathbb{N}}$ executed by the Internal Recursive DR Distribution Generator of our specific DRG embodiment, DRG (N, n, k):

The Unitary Recursive Generation Process:

The set of possible quadratic matrix (if $\Phi$ is restricted over $\{0,1\}^n$) is the convex envelop of all matrix in the set:

$$\{\sigma(S_r) \,|\, \sigma \in \mathfrak{S}_n, r \in \mathbb{N}_n\}$$

where $$S_r(u, v) = \begin{cases} 1 & \text{if } u < r \text{ and } v < r \\ 0 & \text{otherwise} \end{cases}$$

corresponding to the matrix of the Dirac distribution for the vector $\{1, \ldots, 1_r, 0, \ldots, 0\}$.

We can easily calculate that, for r not too close from 0 or 1:

$$\|S_r - \overline{S_r}\|_c = \begin{cases} \dfrac{r(r-1)}{n(n-1)} & \Leftrightarrow r < \dfrac{n}{2} \\ \dfrac{(n-r)(n-r-1)}{n(n-1)} & \Leftrightarrow r \geq \dfrac{n}{2} \end{cases}$$

and therefore to determine if the Dirac distribution $\delta_x \in \zeta(\alpha)$.

The initial seed $\Phi_0$ of the process is taken among any predefined subset of $\zeta(\alpha)$ that can be ranged algorithmically. In the present embodiment, we consider for instance the subset of all convex linear combination of Dirac distributions that remains in $\zeta(\alpha)$.

$$\sigma_1 = I^{de}{}_n$$

$$\Phi_1 = \Phi_0 \circ \sigma_1$$

$\hat{\omega}_m$ is performing a minimum value in:

$$\min_{\omega \in \Omega} \left\{ \omega, \sum_{s=1}^{m} \lambda_{m,s} \Phi_s \right\}$$

where $\{\lambda_m, s\}_{s \leq m}$ is called the characteristic function of the DRG, that verifies $$\lambda_{m,s} \geq 0, \text{ and } \sum_{s=1}^{m} \lambda_{m,s} = 1;$$

$\Psi$ is chosen randomly in the initial subset, and it can be proven (the details are complex and are not presented in this description) that one can choose $\sigma_{m+1}$ such that:

$$\langle \hat{\omega}_m, \Psi \circ \sigma_{m+1} \rangle \geq \dfrac{C(\alpha)}{n}$$

Then we set $\Phi_{m+1}$ as:

$$\Phi_{m+1} = \Psi \circ \sigma_{m+1}$$

$\hat{\omega}_m$ and $\sigma_{m+1}$ can be determined (using also classical randomness regarding $\Psi$ and $\sigma_{m+1}$) at each step by the Internal Recursive DR Distribution Generator.

Then we can use a method to combine distributions in (a):
The Internal Combination Process:
We first select $\Psi$ in $\zeta(\alpha)$, and a set $\{\Psi_s\}_{s \in \{1, \ldots, N\}}$ of «to be combined» distributions also in $\zeta(\alpha)$. Let $\sigma_s$ be a permutation such that $$\Delta_0(\Psi, \Psi_s \circ \sigma_s) \geq \left( \dfrac{\alpha}{4} - \triangleleft \left( \dfrac{1}{n} \right) \right)^2,$$

it can be proved (the details are complex and are not presented in this description) that such permutation always exists. Thus, $$\Delta_0 \left( \Psi, \dfrac{1}{N} \sum_{s=1}^{N} \Psi_s \circ \sigma_s \right) = \dfrac{1}{N} \sum_{s=1}^{N} \Delta_0(\Psi, \Psi_s \circ \sigma_s) \geq \left( \dfrac{\alpha}{4} - \triangleleft \left( \dfrac{1}{n} \right) \right)^2$$

and the combined distribution is then:

$$\Phi = \dfrac{1}{N} \sum_{s=1}^{N} \Psi_s \circ \sigma_s.$$

The association of the Unitary Recursive Generation Process and the Internal Combination Process presented above gives the following description of the Internal Recursive DR Distribution Generator DRG(N, n, k) (as per [FIG. 4-400]):

The AE runs a recursive and continuous generation process in which N continuos sequences $\{\Phi[p]^{|m\rangle}{}_{p \in N_N^*, m \in N}\}$ are running in parallel according to a Unitary Recursive Generation Process presented above. It can also be decided (over random decision) to update the current value of a given sequence by a combination of the current values of the sequences using the Internal Combination Process presented above. The quality of the Deep Random depends on the variety of the initial subset and also on the increasing number of steps (rounds) performed in each sequences. The Internal Recursive DR Distribution Generator should run at least during n x N steps before receiving any request from an ICM. N should be roughly equal to ln (n!)~n ln(n), which represent the entropy needed to encode a member of the set of permutations $\mathfrak{S}_n$.

At the time when an ICM request the selection of DR distribution to the DRG (as per [FIG. 4-410]), a final treatment is performed for the internal selection of the distribution by the Communication Interface to the Internal Recursive DR Distribution Generator (as per [FIG. 4-420]): the Communication Interface picks ([FIG. 4-430]) an integer c among $\{1, \ldots, N\}$; the probability to pick c in $\{1, \ldots, N\}$ is N/c(c+1)(N+1); by this, the probability of 1/c is roughly equidistributed over [0,1]. Then the AE randomly selects c sequences among N ([FIG. 4-430]) and elects its distribution $\Phi$ as the linear combination $$\dfrac{1}{c} \sum_{r=1}^{c} \Phi[p_r]_{m_r(t)};$$

where t is the instant of the execution of this process, $\{p_1, \ldots, p_r\}$ are the indices of the c selected sequences, $m_r(t)$ is the current value of the counter of the sequence $\Phi[p_r]$ at the instant of the execution. The justification of this process is that the final distribution should be in an almost convex subset, and thus should also have its $\alpha$-parameter in a convex segment. Indeed, the Dispersion step (step 2) of the Perfect Secrecy Protocol presented hereafter uses the convex transformation $$\Phi \mapsto \dfrac{1}{2}(\Phi + \Psi),$$

and this transformation lowers the $\alpha$-parameter; a linear convex transformation with c summed distributions roughly lowers the $\alpha$-parameter with a multiplicative constant 1/c. Of course, even if this process enables then to trustfully apply the hypothesis (H) and (H') presented in the summary of the invention, the price to pay is that it introduces some low-probability occurrences in which the opponent can win with the separable strategy $$\omega = \frac{k|i||j|}{n^2}$$

because, by lowering the α-parameter, one obtains that the elected distribution comes closer to a symmetric one. Those low-probability occurrences thus correspond to the case of large values of c, which is roughly equivalent to low values of the the α-parameter.

Ultimately, the elected distribution Φ is also transformed (always within interaction [FIG. 4-420]) by a permutative sleeking transform:

$$\Phi \mapsto T_\gamma[\Phi] \triangleq \sum_{\sigma \in \mathfrak{S}_n} \gamma(|\sigma|)\Phi \circ \sigma$$

where γ, called a permutative sleeking kernel, is a function $\mathbb{N}_n^* \to [0,1]$ (note that it is impossible that $|\sigma|=1$ and thus the component for 1 can be ignored) that verifies:

$$\sum_{\sigma \in \mathfrak{S}_n} \gamma(|\sigma|) = 1$$

This final transform is necessary to «smooth» the Dirac distributions, and avoid specific prevarication (the technical details are too complex to be presented in this description). The permutative sleeking kernel γ is chosen as a configuration parameter of the DRG.

The explanation about the design of Unitary Recursive Generation Process within this specific embodiment DRG (N, n, k) is the following:

With an infinite counter privately executed within the Internal Recursive DR Distribution Generator, the moments m and m+1 are indistinguishable for the opponent ξ. If a set $\Omega_m$ of winning strategies at the moment m exists for ξ, then for any probability distribution Φ:

$$\frac{1}{|\Omega_m|} \sum_{\omega \in \Omega_m} \langle \omega, \Phi \rangle \geq \left\langle \frac{1}{|\Omega_m|} \sum_{\omega \in \Omega_m} \omega, \Phi \right\rangle$$

and thus, by choosing at moment m+1 the probability distribution $\Phi_{m+1}$ such that:

$$\left\langle \frac{1}{|\Omega_m|} \sum_{\omega \in \Omega_m} \omega, \Phi_{m+1} \right\rangle \geq \frac{C}{n}$$

(which is always possible as explained above) the AE guarantees, provided that $$\frac{1}{k} \ll C,$$

that no absolute winning strategy exist to estimate $$\frac{x \cdot y}{nk},$$

because the moment of observation cannot be determined by opponent as rather being m or m+1.

On the other hand, by denoting $$V_A = \frac{x \cdot j}{n}, V_B = \frac{i \cdot y}{n},$$

where x,y would be experiment from Φ, it can be calculated that:

$$E\left[\left(V_A - \frac{x \cdot y}{nk}\right)^2\right] = E\left[\left(V_B - \frac{x \cdot y}{nk}\right)^2\right] \leq \frac{1}{nk} \tag{E}$$

This process is indeed generating Deep Randomness, because if not, the opponent would be able by Bayesian inference to estimate $$\frac{x \cdot y}{nk}$$

from the public information i,j with the same accuracy than $V_A$ or $V_B$.

ii) Description of a Specific Embodiment of Perfect Secrecy Protocol

Figure 2:
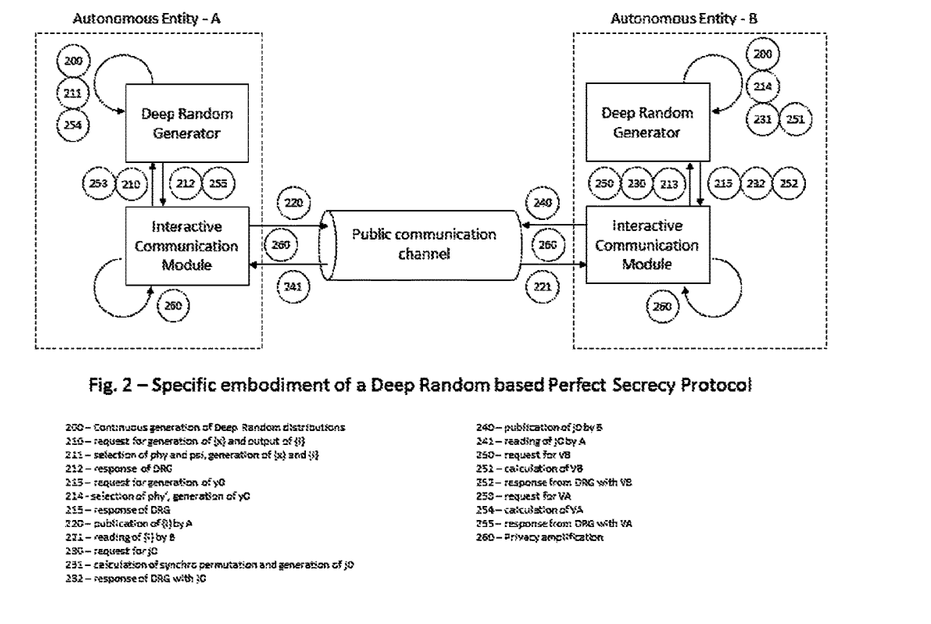
FIG. 2 shows the specific embodiment of a Deep Random based Perfect Secrecy Protocol (related to section 5) with the successive interactions executed between the AE involved in the protocol (denoted A and B). Each of those interactions is described in section 5.

FIG. 2. shows an embodiment of Perfect Secrecy Protocol $\mathcal{P}$ P(λ, θ, N, n, k) in block diagram form, where (λ,θ,N,n,k) are public parameters of the protocol, set up between the corresponding entities denoted A and B.

A and B are two AE, called the legitimate partners, each equipped with a DRG and an ICM. Both ICM are connected to the errorless public channel, so that A and B can publish on the channel, and read the information published by the other party.

The steps of the protocol $\mathcal{P}$ (λ, θ, N, n, k) are the followings:

Step 1—Deep Random Generation:

A and B both independently run a recursive generation sequence of Deep Random probability distributions [FIG. 2-200] using typically a DRG(N, n, k) as described above in subsection 5.i). A and B desire to enter into secure communication and start the protocol by both picking independently the respective probability distributions Φ and Φ' by requesting their DRG(N, n, k) as per [FIG. 2-210&211&213&214, FIG. 4-410&420]. The result of this step is that A (resp. B) draws the parameter vector $x_0 \in [0,1]^n$ from Φ (resp. $y_0 \in [0,1]^n$ from Φ'), and stores $x_0$ (resp. $y_0$) in the Internal Memory of its DRG as per [FIG. 4-440].

Step 2—Dispersion:

A also picks a second probability distribution W from its DRG(N, n, k) as per [FIG. 2-210&211&213&214]. W is used to scramble the repeated draws of Φ. A requests its DRG(N, n, k) to draw N parameter vectors $\{x_1, \ldots, x_N\} \in \{[0,1]^n\}^N$ from ½(Φ+Ψ). B draws N parameter vectors $\{y_1, \ldots, y_N\} \in \{[0,1]^n\}^N$ from Φ'. A (resp. B) stores $\{x_1, \ldots, x_N\}$ (resp. $\{y_1, \ldots, y_N\}$) in the Internal Memory of its DRG as per [FIG. 4-440].

Step 3—Degradation:

A generates N+1 Bernouilli experiment vectors $\{i_0, \ldots, i_N\} \in \{\{0,1\}^n\}^{N+1}$ respectively from $$\left\{\frac{x_0}{k}, \ldots, \frac{x_N}{k}\right\}$$

as per [FIG. 2-210&211, FIG. 4-430&441]. A publishes $\{i_0, \ldots, i_N\}$ as per [FIG. 2-220].

Step 4—Synchronization:

B reads $\{i_0, \ldots, i_N\}$ from the public channel as per [FIG. 2-221] and calculates a synchronization permutation $\sigma_B = \sigma_B [\{i_s\}^*, \{y_s\}^*]_{s \in \mathbb{N}_N^*} \in \mathfrak{S}_n$ that satisfies the condition:

$$\mathrm{Card}\left\{s \in \mathbb{N}_N^* \,\Big|\, \left(\frac{|i_s||y_s|}{n^2} - \frac{i_s \cdot \sigma_B^{-1}(y_s)}{n}\right)^2 \geq \frac{\theta}{n}\right\} \geq \lambda N$$

and then generates a Bernouilli experiment vectors $j_0 \in \{0, 1\}^n$ from $$\frac{\sigma_B(y_0)}{k}.$$

B publishes $j_0$ as per [FIG. 2-230&231&232&240].

Step 5—Advantage Distillation:

A reads $j_0$ from the public channel as per [FIG. 2-241] and calculates $$V_A = \frac{x_0 \cdot j_0}{n}$$

as per [FIG. 2-253&254&255, FIG. 4-412&441&442], B calculates $$V_B = \frac{i_0 \cdot y_0}{n}$$

as per [FIG. 2-250&251&252, FIG. 4-412&441&442]

Step 6: classical reconciliation and privacy amplification techniques lead to get accuracy as close as desired from perfection between estimations of legitamate partners, and knowledge as close as desired from zero by any unlimitedly powered opponent.

It can be proved (the details are complex and are not presented in this description) that appropriate choice of the parameters $(\lambda, \theta, N, n, k)$ enables to make steps 4 and 6 possible. The use of Deep Random as described in steps 1 and 2 enable to restrict the strategies of the opponent as follows:

Dispersion step of the protocol enables to restrict to the set of strategies $\omega_{j_0, i_0}$ that only depends on public information $j_0$, $i_0$ Synchronization step leads to restrict to the set of strategies such that $\omega_{i,j} = \omega_{\sigma(i),\sigma(j)}, \forall \sigma \in \mathfrak{S}_n$, in other words strategies invariant by common permutation on $i_0, j_0$. which both lead to the restricted set of strategies $\Omega_\#$:

$$\Omega_\# = \{\omega \in [0,1]^{2^{2n}} | \omega_{i,j} = f(|i|, |j|, i \cdot j), \forall f : \mathbb{N}_n^3 \mapsto [0,1]\}$$

The step 4 is necessary to ensure that the opponent cannot take advantage of the independance between the selection of $\Phi$ and $\Phi'$ by A and B, which could efficiently let him estimate $$\frac{x \cdot y}{nk}$$

by using the strategy $$\frac{k|i_0||j_0|}{n^2}.$$

Thanks to the synchronization step, such strategy becomes unefficient, because of the nature of the initial seed $\Phi_0$ used in the DRG(N, n, k). The repeated draws of $\Phi$ are used to synchronize $\Phi$ and $\Phi'$, but they shouldn't help to gain knowledge on $\Phi$. This is the role of dispersion in step 3.

It is important to remark that the calculation of $\sigma_B = \sigma_B [\{i_s\}^*, \{y_s\}^*]$ at step 4 only relies on the index $s \in \mathbb{N}_N^*$, so excluding 0. Indeed, the choice of $\sigma_B$ must remain independant from $i_0$, so that $i_0$ and $j_0$ remain draws of independant Bernouilli random variables, then allowing to apply the above upper bound (E) for the legitimate partners.

The explanation for this embodiment is the following: it can be proved that (the details are complex and are not presented in this description), whatever opponent's strategy $\omega$ in the restricted set $\Omega_\#$:

$$E\left[\left(\omega - \frac{x \cdot y}{nk}\right)^2\right] \geq \frac{C'}{n}$$

where C' is a constant. On the other hand, we still have:

$$E\left[\left(V_A - \frac{x \cdot y}{nk}\right)^2\right] = E\left[\left(V_B - \frac{x \cdot y}{nk}\right)^2\right] \leq \frac{1}{nk} \quad \text{(E)}$$

and thus, provided that $$\frac{1}{k} \ll C',$$

an Advantage Distillation is obtained at step 5.

It is also obtained in the theoretical analysis that, N should be again roughly equal to $\ln (n!) \sim n \ln(n)$, to obtain a satisfying probability to match the synchronization criteria at step 4 with the choice of $\sigma_B$.

6. INDUSTRIAL APPLICATION

An industrial embodiment of a Perfect Secrecy Protocol enables two entities communicating over an insecure communication channel, to generate commonly and exclusively a secure shared information. This information, that can be of size as long as desired (repetition of the protocol); it can be used to exchange securely a meaningful message between the legitimate partners or directly (one time pad XOR) or by exchanging a symmetric cryptographic key applicable with any block or stream cipher.

Thus it can be used to secure very sensitive communication for which the security of unproven cryptographic methods may appear as not sufficient.

Such embodiment can be performed under the shape of software programs, that can be embedded in communication devices or IT applications. It can also be embedded in dedicated cut-through tamper resistant secure communication devices.

The invention claimed is:

1. A method based on a communication protocol over an insecure public communication channel, such that two communicating entities, called A and B or jointly legitimate partners, to exchange secret common information, the method comprising:

performing a Deep Random Generation step where A and B use an associated Deep Random Generator (DRG) to select a probability distribution, the probability distribution for A and B being, by design of the associated DRG, impossible to distinguish by any external observing entity within a set of probability distributions $\varrho_A$ for A and $\varrho_B$ for B, and to generate private information $X_A$, $X_B$, performing a protocol step where A and B generate and publish on the insecure public communication channel a set of public information $Y_A$ for A and $Y_B$ for B;

performing an advantage Distillation step where A and by B compute a value of a function $V_A(X_A,Y_A,Y_B)$ for A and $V_B(X_B,Y_A,Y_B)$ for B, wherein a Bayesian inference $V_E=E[X_A|Y_A,Y_B]\varrho_A$ performed by an external observer E using an estimated probability distribution of $X_A$ chosen randomly within $\varrho_A$ is statistically less accurate to estimate $V_A$ than the estimation $V_B$ obtained by B;

performing reconciliation and privacy amplification step to ensure that the estimated shared secret information by the legitimate partners become as close as desired from equality, and that the estimation from an opponent to become as close as desired from total uncertainty, wherein the two communication entities generate source of randomness, called a Deep Random Generator (DRG) and designed to a given communication protocol, where the probability distribution of the private information $X_A$ for A ($X_B$ for B respectively) is unknown and indistinguishable from each other within the set of probability distributions $\varrho_A$ for A ($\varrho_B$ for B respectively) by any external observer, the DRG being possibly implemented:

(a) by executing recursively and continuously a local emulation of the protocol in which, at each new incrementing step $t=m+1$, a new probability distribution $D_{m+1}$ is selected in such a way that the Bayesian inference $V_E=E[X_A|Y_A, Y_B]_{D_t,t<m}$ performed by an emulated external observer E using an estimated probability distribution of $X_A$ chosen randomly within the set of the previous distributions $D_t$, $t<m$ is statistically less accurate to estimate $V_A$ than the estimation $V_B$ obtained by B at step $t=m+1$;

(b) by using probability distributions executed within tamper resistant environment; (c) by a combination of several sources of Deep Randomness of type (a) or (b).

2. The method as described in claim 1, wherein the method is associated to a classical secret key encryption method in a way that the estimated secret shared information enable each legitimate partner to generate a secret key that is to be used in the classical-secret key encryption method to further exchange information securely.

3. The method as described in claim 1,
wherein the method is repeated to generate a one time pad message S shared between the communicating entities A and B,
wherein the communicating entity A combines S by an XOR operation, or by bijective combination, to a plaintext message M,
wherein the communicating entity A sends the result of the combination between S and M to the communicating entity B, and
wherein the communicating entity B obtains the message M by reversing the method of communicating entity A and by calculating the one time pad message S.

4. The method as described in claim 1, wherein an authentication method between the communicating entities A and B to authenticate sender of a message within the communication protocol, thus making the method resistant to an active opponent from forging and sending messages over the insecure public communication channel.

5. The method as described in claim 1, wherein the method securely exchanges parameters of the probability distribution produced by the DRG, from the communicating entity running the DRG of a level 1 to the communicating entity running the DRG of a level 2, the probability distribution of the two communicating entities is combined within the DRG of the level 2.

6. The method as described in claim 1, wherein the communication protocol comprises:
the Deep Random Generation step, wherein the communicating entities A and B select the probability distribution produced by the DRG taking values in $[0,1]^n$, $\Phi$ for A and $\Phi'$ for B, the DRG being designed in such a way that the only distributions that are far from their symmetric projection, meaning for $\Phi$ far from $$\frac{1}{n!}\sum_{\sigma\in\mathfrak{S}_n}\Phi\circ\sigma,$$

the communicating entities A and B then respectively generate the vector $x_0$ and $y_0\in[0,1]^n$ from their respective distributions and keep those data secret;

a Dispersion step, wherein A chooses a second distribution $\Psi$ thanks to its DRG and generates N vectors $\{x_1,\ldots,x_N\}$ from repeated draws using the distribution $\frac{1}{2}(\Phi+\Psi)$, B generates N vectors $\{y_1,\ldots,y_N\}$ from repeated draws using the distribution $\Phi'$, each one keeping secret its sequence of vectors;

a Degradation step, wherein A generates N+1 Bernoulli experiment vectors $\{i_0,\ldots,i_N\}\in\{\{0,1\}^n\}^{N+1}$ respectively from parameter vector $$\left\{\frac{x_0}{k},\ldots,\frac{x_N}{k}\right\}$$

where k is a Degradation parameter strictly superior to 1, A publishes $\{i_0,\ldots,i_N\}$ for B on the insecure public channel;

a Synchronization step, wherein B reads the Bernoulli vectors $\{i_0,\ldots,i_N\}$ from the insecure public channel and computes the synchronization permutation $\sigma_B=\sigma_B[\{i_s\}^*,\{y_s\}^*]_{s\in\varrho_{A_N}}\in\varrho_{A_n}$ that satisfies the condition $$\mathrm{Card}\left\{s\in\mathbb{N}_N^*\left|\left(\frac{|i_s||y_s|}{n^2}-\frac{i_s\cdot\sigma_B^{-1}(y_s)}{n}\right)^2\geq\frac{\theta}{n}\right.\right\}\geq\lambda N,$$

where $\theta$ and $\lambda$ are positive numerical parameters, then B generates the Bernoulli experiment vector $j_0$ from the parameter vector $$\frac{\sigma_B(y_0)}{k}$$

and published $j_0$ for A on the insecure public channel;

the Advantage Distillation step, wherein A reads $j_0$ from the insecure public channel, and computes $$V_A=\frac{x_0\cdot j_0}{n}$$

its estimation of the shared secret information, B computes $$V_B = \frac{y_0 \cdot i_0}{n}$$

its estimation of the shared secret information;

the Reconciliation and Privacy Amplification step, wherein A and B use classical Reconciliation and Privacy Amplification techniques in order to obtain at the same time (a) as close as desired from perfection between their respective estimations of the shared secret information, and (b) that the estimation from the opponent is as close as desired from total uncertainty.

7. The method as claimed in claim 6, wherein the Deep Random Generator includes:

(i) an Internal Recursive DR Distribution Generator (IRDRG) that executes in a continuous and recursive manner at each step m+1, the process generates a probability distribution $\Phi_{m+1}$ with values in $[0,1]^n$ far from its symmetric projection, e.g.

$$\frac{1}{n!} \sum_{\sigma \in \mathfrak{S}_n} \Phi_{m+1} \circ \sigma,$$

and a permutation $\sigma_{m+1}$, such that $$\langle \hat{\omega}_m, \Phi \circ \sigma_{m+1} \rangle \triangleq E\left[\left(\hat{\omega}_m - \frac{x \cdot y}{nk}\right)^2\right]_{\Phi_{m+1} \circ \sigma_{m+1}, \Phi_{m+1} \circ \sigma_{m+1}} \geq \frac{c}{n},$$

where C is a parameter of the IRDRG, and $\hat{w}_m$ being an optimal strategy of the opponent at step m, defined as satisfying $$\min_{\omega} \left\langle \omega, \sum_{s=1}^{m} \lambda_{m,s} \Phi_s \right\rangle,$$

where $\{\lambda_{m,s}\}_{s \leq m}$ is a parameter of the generator called characteristic function, satisfying $$\lambda_{m,s} \geq 0 \text{ and } \sum_{s=1}^{m} \lambda_{m,s} = 1;$$

(ii) an Internal Memory;
(iii) an Internal Standard Random Generator; and
(iv) a communication interface that requests at any moment by an external Interactive Communication Module to perform a computation on a signal issued by the IRDRG and memorized by the Internal Memory, or to erase a memorized signal, or to order the generation of a signal by the IRDRG, in which case the said communication interface obtains a current value of recursive sequence of probability distributions from the IRDRG and memorizes in the Internal Memory either the parameters of the distribution corresponding to the current value, or a signal generated randomly from the probability distribution corresponding to the current value.

8. A network communication apparatus for securely exchanging information as in the methods of claim 1, comprising:

a tamper resistant DRG; and
an Interactive Communication Module (ICM) requesting the DRG and performing the communication protocol, wherein the network communication apparatus performs the communication protocol in roles of the communication entities A and B, and thus two apparatus performed by the two communication entities A and B with the respective roles of A and B, being able to perform the communication protocol between A and B.

9. The apparatus as described in claim 8, wherein the Interactive Communication Module (ICM) performs a method, wherein (i) the method for Deep Random Generation relies on a continuous and recursive process generating at each new step a probability distribution that defeats the optimal estimation strategy corresponding to the previous step, for the communication protocol executed by the ICM, and (ii) the signal generated by the Internal Recursive DR Distribution Generator (IRDRG) is kept inside a tamper resistant container of the apparatus, and only generation, computation, and suppression operations of the signal generated by the IRDRG is requested from outside by an associated external ICM.

10. The apparatus as described in claim 8, wherein the apparatus comprises:

(i) an Internal Recursive DR Distribution Generator (IRDRG),
(ii) a communication interface,
(iii) an Internal Standard Random Generator; and
(iv) an Internal Memory, the modules being protected inside the tamper resistant container of the apparatus, and manufactured and embodied in a way to enable a Deep Random Generation method, and the internal standard random generator capable to execute the protocol, in either roles of A and B, and thus the two apparatus performed by the two communication entities A and B using them with the respective roles A and B, being able to perform the protocol between A and B.

* * * * *

UNITED STATES PATENT AND TRADEMARK OFFICE
CERTIFICATE OF CORRECTION

PATENT NO. : 10,396,983 B2  
APPLICATION NO. : 15/562799  
DATED : August 27, 2019  
INVENTOR(S) : Thibault de Valroger Page 1 of 1

It is certified that error appears in the above-identified patent and that said Letters Patent is hereby corrected as shown below:

In the Claims

Column 15, Lines 33-34:
Claim 1 reads "Bayesian inference $V_E=E[X_A|Y_A, Y_B]_{Dt,t<m}$ performed"

Should read --Bayesian inference $V_E = E[X_A|Y_A, Y_B]_{D_t, t \leq m}$ performed--

Column 16, approximate Lines 44-45:
Claim 6 reads "permutation $\sigma_B = \sigma_B[\{i_s\}^*, \{y_s\}^*]_{s \in} N+\in {}_n$ that satisfies"

Should read --permutation $\sigma_B = \sigma_B[\{i_s\}^*, \{y_s\}^*]_{s \in \mathbb{N}_N^*} \in \mathfrak{S}_n$ that satisfies--

Signed and Sealed this  
Twenty-ninth Day of October, 2019

Andrei Iancu  
*Director of the United States Patent and Trademark Office*